United States Patent [19]
Byrnes et al.

[11] Patent Number: 6,070,660
[45] Date of Patent: Jun. 6, 2000

[54] VARIABLE SPEED FAN MOTOR CONTROL FOR FORCED AIR HEATING/COOLING SYSTEM

[75] Inventors: Howard P. Byrnes, Dallas; Daniel B. Steffen, Plano, both of Tex.

[73] Assignee: Hoffman Controls Corp., Dallas, Tex.

[21] Appl. No.: 08/801,560

[22] Filed: Feb. 18, 1997

[51] Int. Cl.$^7$ .............................. F25B 29/00; F23N 5/20
[52] U.S. Cl. ........................... 165/244; 165/247; 236/11; 236/49.3; 236/DIG. 9; 62/157; 62/180; 62/186; 62/231
[58] Field of Search ...................... 236/11, 49.3, DIG. 9; 165/244, 247; 62/157, 180, 186, 231

[56] References Cited

U.S. PATENT DOCUMENTS

| | | | |
|---|---|---|---|
| 3,489,345 | 1/1970 | Moreland | 236/11 |
| 3,912,162 | 10/1975 | Bauer et al. | 236/11 |
| 4,369,916 | 1/1983 | Abbey | 236/11 |
| 4,684,060 | 8/1987 | Adams et al. | 236/11 |
| 4,842,190 | 6/1989 | Orchard | 236/11 |
| 5,248,083 | 9/1993 | Adams et al. | 236/11 |
| 5,492,273 | 2/1996 | Shah | 236/186 |
| 5,582,233 | 12/1996 | Noto | 165/247 |

FOREIGN PATENT DOCUMENTS

| 1597220 | 9/1981 | United Kingdom | 236/11 |
|---|---|---|---|

*Primary Examiner*—John K. Ford
*Attorney, Agent, or Firm*—Akin, Gump, Strauss, Hauer & Feld, LLP

[57] ABSTRACT

A forced air heating and/or cooling system utilizing a permanent split capacitor (PSC) or shaded pole AC induction motor and including an actuator for energizing a source of heating and/or cooling effect may be controlled by a controller circuit which is operable to continuously vary the speed of the fan motor during a start-up phase and a shut-down phase of the heating and/or cooling cycle. The controller circuit includes terminals for connection to the source of electrical energy for the heating and/or cooling system and for connection to the system controls without altering the control function or circuitry thereof. The controller circuit includes elements for operating the fan motor to continuously vary its speed on start-up over a first predetermined time period and to continuously vary its speed down to a predetermined minimum on shutdown of the heating or cooling equipment over a second predetermined time period to minimize temperature stratification of air in the space being cooled or heated and to maximize capture of residual heat/cooling effect of the system. Another embodiment of the controller circuit includes temperature sensors which are operable to control start-up and shutdown of the fan motor over continuously variable speed operating cycles in response to sensed temperature of the air being circulated by the fan.

4 Claims, 4 Drawing Sheets

VARIABLE SPEED FAN MOTOR CONTROL FOR FORCED AIR HEATING/COOLING SYSTEM

FIELD OF THE INVENTION

The present invention pertains to a control system for continuously varying the speed of a fan drive motor for a forced air indoor space heating/cooling system during startup and after shut-down of a heating/cooling cycle.

BACKGROUND OF THE INVENTION

Forced air heating and cooling systems for indoor spaces in residential and commercial buildings are ubiquitous. A long-standing practice in controlling forced airflow through the heat exchanger, heating coils, evaporator coils and other heat exchange equipment in indoor space heating and cooling systems includes providing controls for the forced air fan or blower drive motor which delay startup of the drive motor when the heating or cooling source has been energized and another delay in shutdown of the fan drive motor after the heating/cooling system has been de-energized. Some conventional prior art controls do not provide for any delay of motor startup or shutdown. Conventional controls often provide for delayed startup of the fan drive motor at a single operating speed and delayed shutdown of the drive motor, again at a single maximum operating speed, after shutdown of the heating/cooling system in an effort to minimize unpleasant cold or hot drafts of air and to capture residual heat/cooling effect. However, controlling motor speed from being de-energized to full speed does not preclude stratification of air in the system ductwork or in the space being heated or cooled, nor does such operation maximize the capture of residual heat/cooling effect of the system heat exchange equipment.

Controls have also been developed for forced air heating/cooling systems wherein the indoor space air circulating fan drive motor is driven at reduced speed for a period of time during startup of the heating/cooling system and at a reduced speed for a period of time during the run-on or shutdown phase of the heating/cooling system operating cycle. Again, however, this type of control does not minimize the stratification of warm and cold air in the duct work or the space being heated or cooled nor does this type of system maximize the capture of residual heating/cooling effect.

Accordingly, there has been a strongly felt need for improvements in forced air circulation control in conventional heating and/or cooling systems including systems which use conventional electric motors, such as permanent split capacitor (PSC), shaded pole or other conventional electric motors used in a substantial number of heating/cooling systems manufactured for residential as well as commercial heating and cooling applications of indoor spaces. There has also been a strongly felt need for a fan or blower drive motor control system which may be easily retrofitted to a conventional heating/cooling system control circuits without modifying the circuits and without causing the controls for the heating/cooling system to be out of compliance with regulatory requirements. It is to these ends that the present invention has been developed.

SUMMARY OF THE INVENTION

The present invention provides an improved fan or blower drive motor control system and method for a forced air heating/cooling system for heating/cooling indoor spaces, in particular.

The present invention also provides an improved fan drive motor control system which is operable to substantially continuously vary the speed of the fan drive motor during a starting phase and a shutdown phase of operation of a conventional forced air heating/cooling system.

In particular, the invention comprises a control circuit which may be easily adapted to conventional heating/cooling system controls to vary the forced air fan or blower drive motor speed over predetermined time periods or which may be responsive to temperature sensed in the heating/cooling system airflow circuit.

In accordance with one important aspect of the invention, a control circuit is provided for a conventional AC electric motor drive mechanism for a forced air fan or blower which includes a timing circuit for operating the fan drive motor to continuously vary its speed from zero or a minimum start speed to a maximum or full speed operating speed condition during startup of the heating/cooling cycle, and for operating for a predetermined period of time while continuously reducing the fan speed cycle at the end of a heating/cooling operating cycle of the heating/cooling system. The control circuit includes a bias network, an on-board power supply, an AC voltage wave zero cross-over detector circuit and a control circuit for firing a triac to control the drive motor speed. The control system also includes a minimum speed detector circuit and a circuit which provides for continued operation of the motor at the minimum speed, if desired, or motor shutoff upon reaching the minimum speed.

In one embodiment of the control circuit or system of the invention, the system also senses temperature in the airflow circuit of the heating/cooling system and prevents premature or unwanted operation of the fan drive motor.

The control systems of the present invention advantageously reduce energy consumption of conventional forced air heating and cooling systems, improve recovery of residual heat/cooling effect in conventional forced air heating/cooling systems, minimize stratification of air in the airflow circuit and the space being heated or cooled and reduce cold or hot air drafts during operation of the heating/cooling system. Accordingly, the control systems of the present invention optimize the comfort level provided by a forced air heating/cooling system for an indoor space. Still further, by substantially continuously varying the fan or blower drive motor speed during a startup and shutdown phase, respectively, of an operating cycle, noise associated with fan or blower operation is reduced and the circulation of air at a temperature other than normally sensed or preferred by occupants of the indoor space is also reduced.

The systems and method of operating a forced air fan or blower drive motor for a heating/cooling system for indoor spaces in accordance with the invention is described in further detail herein. Those skilled in the art will appreciate the above-noted features and advantages of the invention together with other superior aspects thereof upon reading the detailed description which follows in conjunction with the drawing.

DESCRIPTION OF THE PREFERRED EMBODIMENTS

Figure 1:
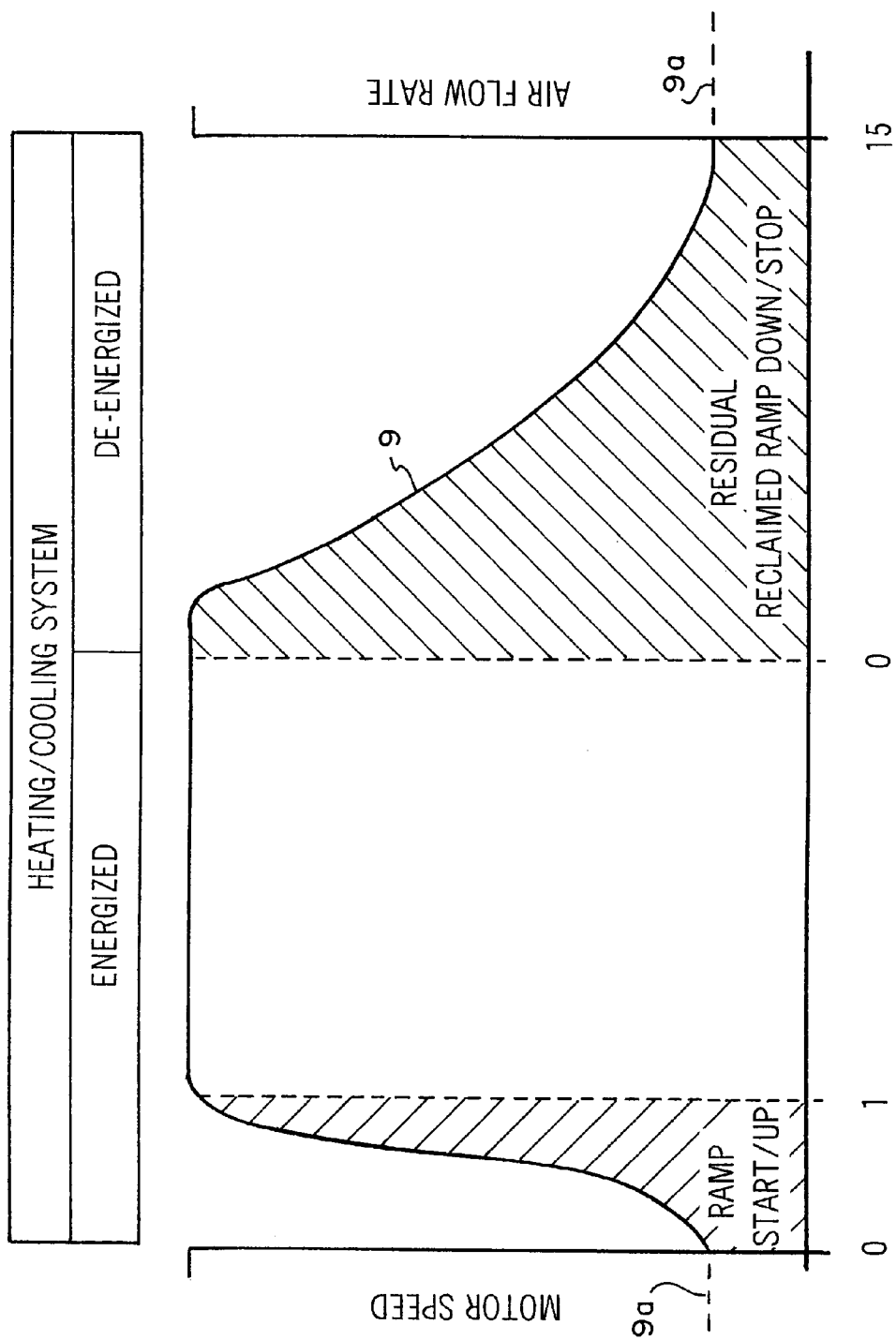
FIG. 1 is a diagram of fan motor speed and airflow rate versus time for an operating cycle of a conventional forced air heating/cooling system in accordance with the present invention.

In the description which follows, like elements are marked throughout the specification and drawing with the same reference numerals, respectively. Conventional elements are shown in somewhat generalized or schematic form in the interest of clarity and conciseness.

Referring to FIG. 1, there is illustrated a diagram of fan or blower drive motor speed versus time, as indicated by the solid line curve 9, for an operating cycle of a heating/cooling system, which system may take various forms. For example, the heating/cooling system may comprise a natural gas, liquified petroleum gas, oil or other combustible material furnace alone or in combination with a vapor compression type refrigeration or "air conditioning" unit wherein the evaporator or cooling coil is interposed in the ductwork or airflow circuit of the system along with the furnace heat exchanger. The source of heat in the system may also be the evaporator coil if the system is a reversible vapor compression unit, such as a so-called heat pump. The source of heating or cooling may be electrical energy conversion devices, for example, or any known source controllable to initiate and terminate or reduce the heating or cooling effect.

In any event, the diagram of the invention indicates how, upon energization of the heating/cooling system, a control system and method in accordance with the invention provides for continuously varying the fan or blower motor speed from zero or a predetermined minimum speed, upon energizing the heating/cooling system to full speed over a predetermined period of time, such as about 1.0 minute, for example. Of course, during energization of the heating/cooling system the forced air fan drive motor preferably operates at a continuous speed to circulate air over the heat exchange surfaces of the apparatus of the heating/cooling system. Finally, in accordance with the invention, upon de-energization of the source of air heating or cooling effect the fan speed is continuously reduced as a function of time over a period of, for example, about 15.0 minutes to a speed of about 25% of steady state full speed, whereupon the fan motor may be de-energized or operated at the selected minimum speed. Accordingly, air flowrate, which is proportional to fan motor speed, also varies, as a function of time, in substantially the same manner and follows the same curve as motor speed. In this way noise associated with the operation of a forced air fan or blower in a heating/cooling system is minimized, especially during start-up, currents of air at temperatures sensible by occupants of the indoor space being heated or cooled are minimized and temperature stratification of air in the air circulation path, including ductwork or conduits, as well as the indoor space being heated or cooled, is also minimized.

Accordingly, the invention contemplates a method of operating a forced air fan or blower drive motor in conjunction with energization and de-energization of a warm air/cool air source or heat exchange surface wherein, upon energization of the heating/cooling system, the fan drive motor is energized at a reduced speed and then the drive motor speed is modulated substantially continuously from the reduced speed up to full speed over a predetermined period of time or as a result of sensing temperature in the indoor space or the ductwork of the heating/cooling system.

After a predetermined period of time, or when a predetermined temperature differential is sensed between the temperature in the heating/cooling system ductwork and the space being heated or cooled, the fan motor is then operated at a continuous "full" speed. Upon de-energization of the heating/cooling system, in response to a thermostat or temperature sensing control system, fan motor speed is substantially continuously modulated or reduced over a predetermined period of time or in response to sensing temperature as mentioned above until a preset limit is reached whereupon the fan motor may be de-energized or operated continuously at the reduced or minimum speed. The above described method is particularly advantageous as will be appreciated by those skilled in the art.

Figure 2:
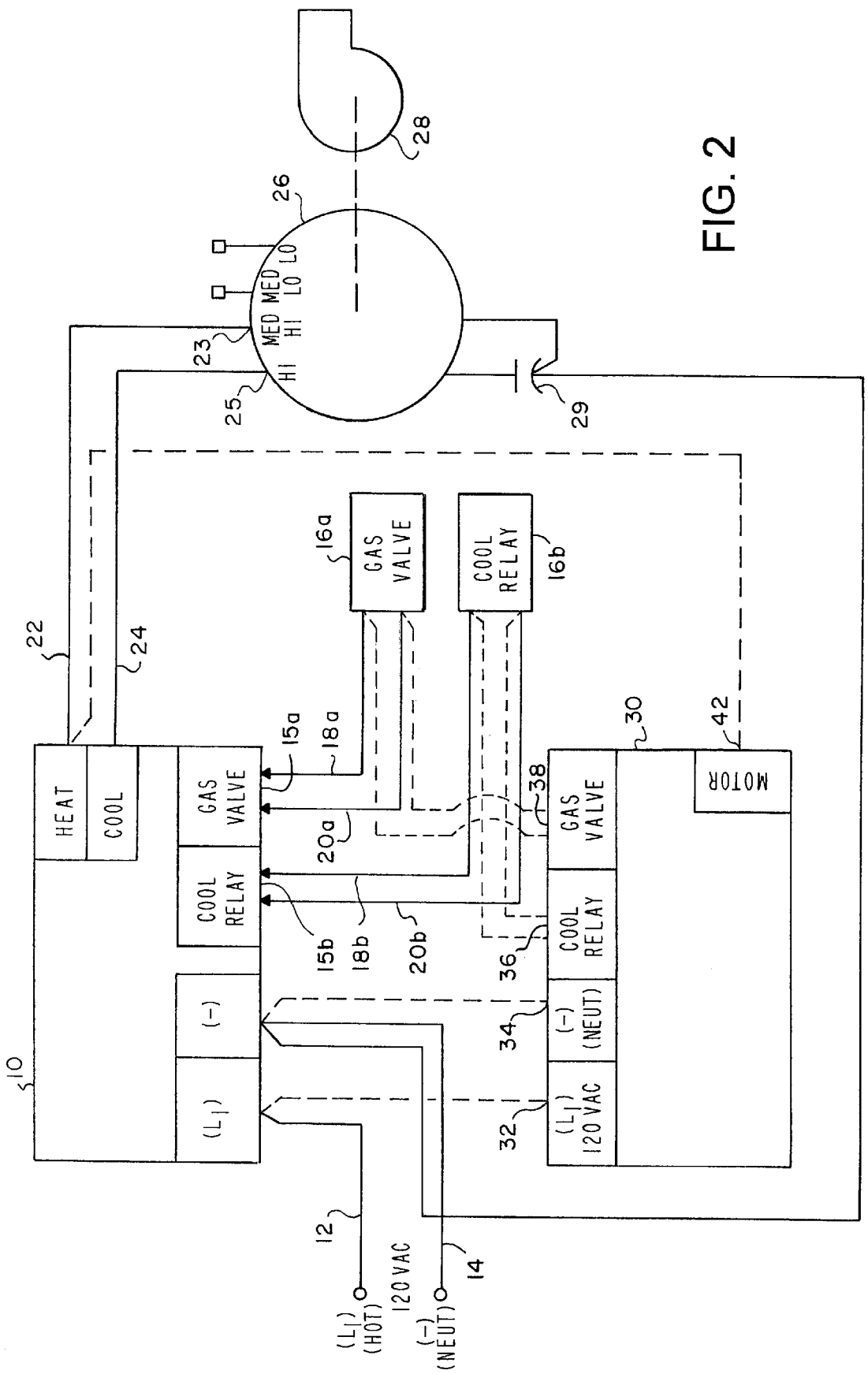
FIG. 2 is a generalized circuit diagram of one conventional forced air heating/cooling system showing the control system of the present invention connected thereto.

Referring now to FIG. 2, there is illustrated a diagram showing how a controller in accordance with the invention may be easily adapted to operate with a conventional control system for a forced air heating/cooling system. A thermostat and conventional mode selection switches are omitted from the diagram of FIG. 2 in the interest of clarity and conciseness. In the diagram of FIG. 2, a conventional heating/cooling system control is shown in generalized form and generally designated by the numeral 10. Conventional gas or oil fired forced air furnaces in combination with vapor compression "air conditioning" units, for example, typically utilize a so-called integrated furnace control circuit of conventional design. Such control circuits include a connector for connecting the control circuit to an AC power source, not shown, by way of conductors 12 and 14. Typical so-called integrated controllers also include a pair of terminals 15a for connecting a heat or "gas" control valve element 16a to the controller 10, by conductors, such as indicated at numerals 18a and 20a. Conductors 22 and 24 are connected to the controller 10 and to the medium speed and high speed conductors or "taps" 23 and 25, respectively, of a multi-speed fan or blower drive motor 26 which is operably connected to a conventional air circulating fan or blower 28. The motor 26 may be a PSC or shaded pole type motor, for example, of a type commonly used in forced air heating, ventilating and air conditioning systems for residential and commercial applications. The motor 26 may also be a single, constant speed type. Motor 26, for example, is operably connected via a capacitor 29 to conductor 14. The motor 26 may be driven at any selected speed but is typically driven at a medium or "medium high" speed when circulating heated air and at a high speed when circulating cooled air through the heating/cooling system. The element 16a may be an actuator for a gas or oil flow control valve or an actuator operable to change its state for energizing and de-energizing an electrical circuit to effect heating. In fact, the element 16a may be any type of device or circuit which is operable to provide a signal to the circuits described herein in conjunction with FIGS. 3 and 4.

As further shown in FIG. 2, the controller 10 also has terminals 15b for outputting a signal to an actuator or other suitable circuit or control device such as a compressor relay 16b for energizing a vapor compression refrigerant compressor, for example. Accordingly, in conventional heating/cooling systems, the controller 10 includes means for generating a signal at terminals 15a and 15b, respectively, for operating respective actuators or circuits, such as the elements or actuators 16a and 16b, shown by way of example.

A motor speed controller in accordance with the invention is illustrated generally in FIG. 2 and also generally designated by the numeral 30. The controller 30, as shown, may be connected to the conventional integrated controller 10 without interrupting any of the circuitry of the control system, including its connections to the electrical power source, the motor 26 or the actuator 16a and 16b, for example. As shown in FIG. 2, the controller 30 includes terminals 32 and 34 for connecting the controller to the electrical power source represented by conductors 12 and 14, and pairs of terminals 36 and 38, respectively, for connecting the controller 30 to the conductors 18a and 20a for actuator 16a and conductors 18b and 20b for actuator 16b. A terminal 42 provides for connecting the controller 30 to motor input conductor 22. Accordingly, the controller 30 may be easily connected to the existing components of a conventional heating/cooling system of the type described and shown in FIG. 2.

Figure 3:
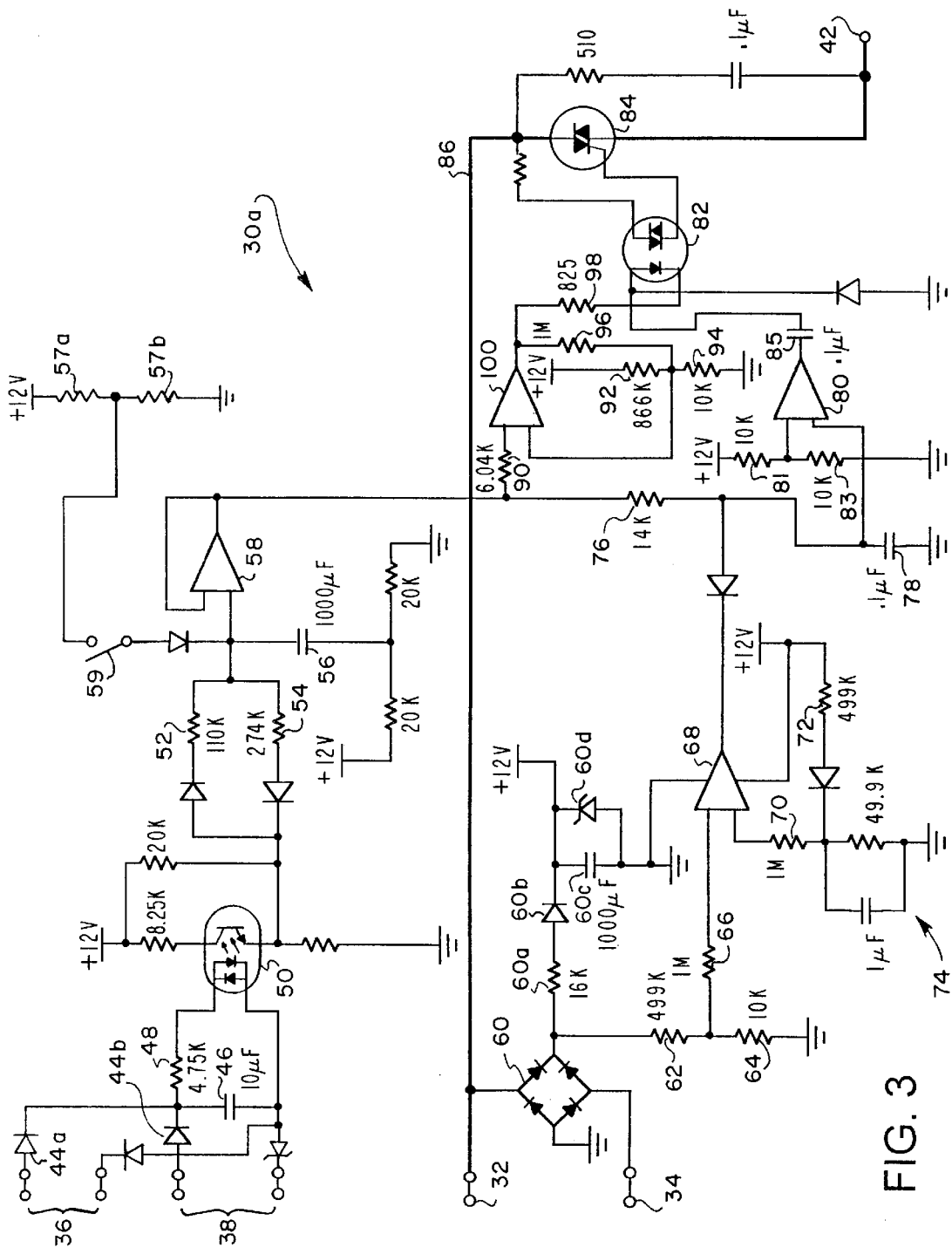
FIG. 3 is a diagram of one embodiment of a fan drive motor control circuit in accordance with the invention wherein fan speed is varied over predetermined periods of time.

Referring now to FIG. 3, there is illustrated a circuit diagram of an embodiment of the controller 30, generally designated by numeral 30a, wherein the control of startup and shut down of the motor 26 is carried out on a time basis. Terminals 36 and 38 are operable to input a control signal, respectively to controller circuit 30a, as shown. Referring further to FIG. 3, the controller circuit 30a is adapted to receive a low voltage (24.0 volts, for example) AC signal at terminals 36 or 38 which are connected to a circuit including diodes 44a and 44b, respectively, a capacitor 46 and a resistor 48 in circuit with an optical coupler 50 which is also connected to a 12.0 volt DC power source from an onboard power supply to be described further herein. The DC signal voltage is exemplary. The output side of the optical coupler 50 is connected to a circuit including a so-called ramp up resistor 52 and a so-called ramp down resistor 54 operably connected to a timing capacitor 56, as shown. The output of the circuit just described is input to an amplifier 58 whose output signal parallels the R/C timing circuit output just described. A motor minimum speed clamp bias circuit including resistors 57a, 57b and a switch 59 is also connected to amplifier 58, as shown.

Circuit elements not otherwise identified in the specification are identified in the drawing figures and are believed to be understandable to those of ordinary skill in the art. Representative values of working parameters of certain elements may be shown in the drawing figures. The controller circuit 30a also includes the aforementioned DC power supply including a bridge rectifier circuit 60, diode 60d, diode 60b, capacitor 60c and resistor 60d in circuit, as shown, for generating the 12.0 volt DC power source required for the circuit elements identified in the diagram of FIG. 3.

Controller circuit 30a further includes a zero crossover detector circuit for the alternating current signal imposed on terminals 32 and 34, including resistors 62, 64 and 66, an amplifier 68, resistors 70 and 72 and an R/C circuit 74, as illustrated. The output signal from amplifier 68 is input to an R/C phase timer circuit including a resistor 76 and capacitor 78, which circuit is connected to an amplifier 80 whose output is connected by way of an optical coupler 82 to means for effectively varying the voltage imposed on motor 26, such as a triac 84. Triac 84 is in circuit with a conductor 86, which is connected to terminal 32, and terminal 42 which is operable to energize the motor 26 at the medium speed tap 23, see FIG. 2. Amplifier 80 is also connected to resistors 81 and 83 at an input terminal whereby the signal intensity of the amplifier output signal may be modified, as needed. A capacitor 85 is interposed in the output conductor of the amplifier 80 as shown. Other motor voltage controlling means may be used in place of triac 84, such as silicon controlled rectifiers, for example.

Amplifier 80 forms a pulse width modulated square wave output signal whose pulse width varies with the change in voltage imposed on capacitor 78. Resistors 81 and 83 form a reference voltage for the other input to amplifier 80. Capacitor 85 differentiates the square wave output from amplifier 80 to provide a pulse type signal at optical coupler 82. The square wave output signal of amplifier 80 moves in respect to the zero crossover voltage of diode bridge 60 to provide a chopped waveform output signal from triac 84 to reduce or increase motor speed.

A minimum speed detector and control circuit is also included in the controller circuit 30a including resistors 90, 92, 94, 96 and 98 operably connected as shown to an amplifier 100 whereby if the "firing" interval of the triac 84 increases beyond a predetermined time period, thus resulting in an unwanted low motor speed, a signal to the optical coupler 82 will effect shutdown of the triac 84 and the motor 26 to prevent damage to the motor bearings due to inadequate lubrication as a result of operation at too low a speed.

Moreover, as mentioned previously, the motor minimum speed clamp bias circuit is operable, if the switch 59 is closed, to continue operation of the motor 26 at the minimum selected speed as indicated by the dashed line portion 9a of the motor speed curve 9, FIG. 1.

The aforementioned crossover detector circuit and R/C phase timer circuits are operable in conjunction with the output signal from amplifier 58 to effect firing of the triac 84 at a predetermined point along the sinusoidal waveform of the alternating current energy source for the motor 26 to effectively vary the voltage imposed on the motor and, consequently, its operating speed. On energization of the motor 26, as a result of a signal imposed on the terminals 36 or 38, the R/C circuit comprising elements 52, 54, 56 and 58 produces a rising voltage signal, with time, which effects faster charging of the capacitor 78 which, in conjunction with the crossover detector circuit, whose output signal is that of amplifier 68, effectively fires the triac 84 more frequently until, at full motor speed, and when the control circuit 10 imposes a motor operating current in its own right on the motor 26, the controller circuit 30a ceases to have any effect on motor operating speed.

Conversely, on de-energization or "shutoff" of the actuators 16a or 16b, any timed output signal from the controller 10 imposed on the motor 26 to drive the motor to capture residual heat or cooling effect, will be effective until that signal ceases. At that time the controller circuit 30a becomes effective to provide for the ramp down of motor speed by timing the firing of the triac 84. During the speed ramp down phase of operation indicated in FIG. 1, an output signal from the bias network including resistor 54, through amplifier 58, progressively reduces the signal imposed on the R/C phase timer circuit, comprising resistor 76 and capacitor 78, until the triac firing interval is reduced to the minimum speed setting of the aforementioned minimum speed detector circuit at which time the triac is no longer energized and the motor 26 ceases operation unless switch 59 is closed to cause the aforementioned minimum speed clamp circuit to be operable. Moreover, if the controller 10 imposes a motor operating voltage signal on terminal 25 to operate the motor at high speed, at any time, no detrimental effect is experienced by the motor or the controller circuit 30a as a result of its connection to the controller circuit.

Figure 4:
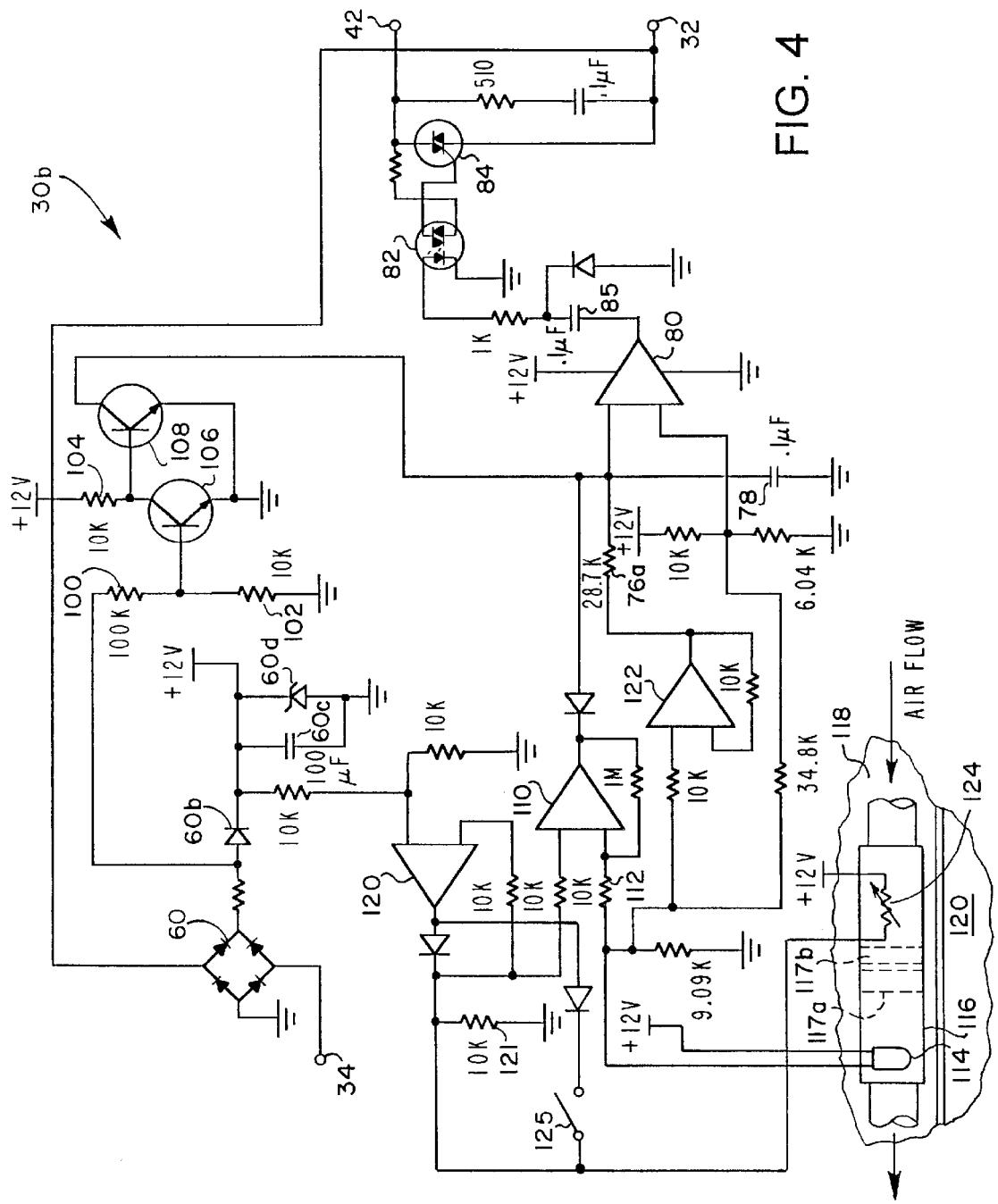
FIG. 4 is a circuit diagram of another embodiment of the control system of the invention wherein the fan drive motor is operated in accordance with temperature sensed in the airflow circuit of a heating/cooling system.

Referring now to FIG. 4, a controller circuit 30b is illustrated including several elements and subcircuits similar to those included in the circuit 30a. For example, a triac firing circuit is included in circuit 30b including an amplifier 80, capacitor 85 and optical coupler 82 which is operable to controlled firing of a triac 84 operably connected to terminals 32 and 42 in substantially the same manner as in the circuit 30a. An R/C phase timer circuit is connected to amplifier 80 and includes a resistor 76a and a capacitor 78. A cross-over detector circuit is operably connected to the aforementioned R/C phase timer circuit, as illustrated in FIG. 4, and includes resistors 100, 102, 104 and transistors 106 and 108, the output of the latter being connected to the aforementioned phase timer circuit and to the output of a motor minimum speed cutoff and detector circuit, including an amplifier 110. Amplifier 110 is also operably connected via a resistor 112 to a temperature sensor 114, preferably located in a plenum 116 of a heating/cooling system.

By way of example, the plenum 116 may be disposed in an attic space 118 above a room 120 which is to be heated and/or cooled by a heating and/or cooling system which includes the fan or blower motor 26 and blower 28 interposed therein, not shown in FIG. 4. Temperature sensor 114 receives 12.0 volt DC input power from a power supply circuit which includes a bridge circuit 60 and the circuit elements shown in FIG. 3 including a resistor 60a, diode 60b, capacitor 60c and diode 60d, connected as shown. A so-called fan motor speed clamp circuit includes a comparator amplifier 120, a reference resistor 121, a temperature sensor in the form of a thermistor 124, and a switch 125, operably connected as shown.

An output signal from sensor 114 is imposed on an amplifier 122 whose output signal is imposed on the R/C phase timer circuit comprising the resistor 76a and the capacitor 78. The output signal from amplifier 122 parallels the output signal of the sensor 114 and, as this voltage signal rises, capacitor 78 is charged through a fixed fire threshold point at a faster time thereby effecting firing of the triac 84 faster after the AC voltage wave zero crossing point is detected by the cross-over detector circuit.

Temperature sensor 124 may be located at a predetermined reference point, such as in the space being heated or cooled by the system connected to the controller 10, see FIG. 2, and the control circuit 30b. Preferably, the sensor 124 is located in the plenum 116 and upstream with respect to the direction of airflow, as indicated in FIG. 4, of heat exchanger means 117a and 117b which, for example, may be an evaporator coil and a furnace heat exchanger, respectively. Accordingly, the plenum 116 is an integrated furnace, air conditioning unit of a type commonly used in residential and commercial heating/ventilation/air conditioning systems. As the temperatures sensed by the sensors 114 and 124 approach the same value and the speed of the motor 26 is reduced an output signal from amplifier 110 will prevent the motor from operating at less than a desired speed to minimize inadequate bearing lubrication. On the other hand if the temperature differential sensed by the sensors 114 and 124 exceeds a predetermined setting, an output signal from amplifier 120 will also prevent operation of the phase timer circuit and the triac 84. Accordingly, if the sensor 114 is located in an attic space, for example, and is subject to temperature extremes above the ambient room temperature when the heating/cooling system is operating on a cooling cycle, for example, the controller circuit 30b will not effect operation of the fan drive motor to circulate hot air in a room when the system is otherwise not operating.

The operation of the controller circuit 30b is similar in most respects to the controller circuit 30a except that the ramp up and ramp down speeds are controlled by sensing temperature with the temperature sensors 114 and 124 and the operation of the controller 30 is based on the temperature sensed as opposed to being based on a predetermined time. For example, upon startup of a heating/cooling system in the heating mode, the sensor 114 will sense a temperature increase in the plenum 116 as furnace heat exchanger 117b begins to warm the air in the plenum. As the temperature differential between the sensors 114 and 124 increases, a progressively increasing signal is imposed on the R/C phase timer circuit to effect more rapid firing of the triac 84 ahead of the wave zero crossing point of the alternating current voltage wave. Once the fan motor 26 has reached full speed and the controller 10 (which includes a temperature sensor in the plenum 116, not shown) energizes the motor in its own right, the controller circuit 30b then becomes ineffective for operation of the motor at full speed during the steady state portion of the operating cycle shown in FIG. 1.

Again, upon shut off of the source of heat or cooling effect, the motor 26 will run on until the temperature changes beyond the setting of a limit switch in the plenum, not shown, and also part of the aforementioned control system 10, whereupon the controller circuit 30b will become effective to modulate fan motor speed down to the predetermined minimum speed as the temperature sensed by sensor 114 approaches that sensed by the sensor 124 and the strength of the signal imposed on the R/C phase timer circuit is reduced progressively to the preset minimum provided by the resistors and 113 and the amplifier 110 of the minimum speed cutoff circuit. If the switch 125 is in a closed position, however, the motor will continue to run at the minimum speed. On the other hand if switch 125 is in an open position, the minimum speed clamp circuit will be inoperable and the motor will shut off once the minimum speed detected by the minimum speed cutoff circuit is reached.

The construction and operation of the controller circuits 30a and 30b is believed to be within the purview of one of ordinary skill in the art based on the foregoing description and the circuit diagrams shown in FIGS. 2, 3 and 4. Although preferred embodiments of a control circuit for operating a fan motor of a forced air heating/cooling system have been described in detail herein, those skilled in the art will also recognize that various substitutions and modifications may be made without departing from the scope and spirit of the invention as recited in the appended claims.

What is claimed is:

1. A controller circuit for substantially continuously varying the speed of a fan drive motor of a forced air heating and/or cooling system including a control system for operating said motor and for controlling an actuator to effect heat transfer to or from air being circulated by a fan drivenly connected to said motor, said controller circuit being responsive to a change of state of said actuator to substantially continuously vary the speed of said motor between a maximum speed and minimum speed, said controller circuit including:

means operable to be connected to a source of electrical energy which is connected to said heating and/or cooling system and to said actuator and to said motor;

means operable to substantially continuously vary the effective voltage imposed on said motor including a phase timer circuit; and a minimum speed detector and cutoff circuit operably connected to said phase timer circuit.

2. The invention set forth in claim 1 wherein:

said motor comprises at least one of a permanent split capacitor motor and a shaded pole motor.

3. The invention set forth in claim 1 wherein:

said controller circuit includes a triac operably connected to said motor and interposed in an electrical circuit for energizing said motor, a triac firing circuit operably connected to said triac, a cross-over detector circuit and said phase timer circuit operably connected to said triac firing circuit.

4. A controller circuit for substantially continuously varying the speed of a fan drive motor of a forced air heating and/or cooling system including a control system for operating said motor and for controlling an actuator to effect heat transfer to or from air being circulated by a fan drivenly connected to said motor, said controller circuit being responsive to a change of state of said actuator to substantially continuously vary the speed of said motor between a maximum speed and minimum speed, said controller circuit including:

means operable to be connected to a source of electrical energy which is connected to said heating and/or cooling system and to said actuator and to said motor;

means operable to substantially continuously vary the effective voltage imposed on said motor including a triac operably connected to said motor and interposed in a circuit for energizing said motor, a triac firing circuit operably connected to said triac, a cross-over detector circuit and a phase timer circuit operably connected to said triac firing circuit; and a minimum speed detector and cutoff circuit operably connected to said phase timer circuit and operable to interrupt voltage to said motor at a predetermined minimum speed of said motor.

\* \* \* \* \*